United States Patent
Rowe et al.

(10) Patent No.: US 9,952,826 B2
(45) Date of Patent: Apr. 24, 2018

(54) AUDIO MIXER SYSTEM

(71) Applicant: HARMAN INTERNATIONAL INDUSTRIES LIMITED, Hertfordshire (GB)

(72) Inventors: Matthew Rowe, Welwyn Garden (GB); Richard Ayres, Hertfordshire (GB); Chris Gomm, Aylesbury (GB); Suvra Saurav Tripathy, Bangalore (IN)

(73) Assignee: Harman International Industries Limited, Hertfordshire (GB)

( * ) Notice: Subject to any disclaimer, the term of this patent is extended or adjusted under 35 U.S.C. 154(b) by 0 days.

(21) Appl. No.: 14/891,886

(22) PCT Filed: May 19, 2014

(86) PCT No.: PCT/EP2014/001349
§ 371 (c)(1),
(2) Date: Nov. 17, 2015

(87) PCT Pub. No.: WO2014/183879
PCT Pub. Date: Nov. 20, 2014

(65) Prior Publication Data
US 2016/0371051 A1    Dec. 22, 2016

(30) Foreign Application Priority Data
May 17, 2013    (EP) .................................... 13002611

(51) Int. Cl.
- H04B 1/00 (2006.01)
- G06F 3/16 (2006.01)
- H04H 60/04 (2008.01)
- G06N 3/04 (2006.01)
- G06N 3/08 (2006.01)
- H02B 1/00 (2006.01)

(52) U.S. Cl.
CPC .......... *G06F 3/165* (2013.01); *G06N 3/0472* (2013.01); *G06N 3/08* (2013.01); *H04H 60/04* (2013.01)

(58) Field of Classification Search
CPC ........ G06F 3/165; G06N 3/0472; G06N 3/08; H04H 60/04
USPC .................. 381/119, 104, 103, 107, 109, 123
See application file for complete search history.

(56) References Cited

U.S. PATENT DOCUMENTS

2011/0075851 A1*    3/2011    LeBoeuf ................ H04R 29/00
                                                                    381/56
2013/0114821 A1*    5/2013    Hamalainen ......... G10K 11/178
                                                                    381/71.6

FOREIGN PATENT DOCUMENTS

| EP | 2506464 A1 | 10/2012 |
| WO | 2009153055 A1 | 12/2009 |

OTHER PUBLICATIONS

International Search Report and Written Opinion for corresponding Application No. PCT/EP2014/001349, dated Oct. 22, 2014, 9 pages.

* cited by examiner

*Primary Examiner* — Vivian Chin
*Assistant Examiner* — Ammar Hamid
(74) *Attorney, Agent, or Firm* — Brooks Kushman P.C.

(57) ABSTRACT

An audio mixer system and method is provided. The audio mixer system includes an audio interface, an audio signal processor, and a control circuit. The control circuit is configured to recognize a source type of an audio signal at the audio interface based on analyzing the audio signal. The control circuit is configured to control a setting of a signal path of the audio signal from an input of the audio interface through the audio signal processor to an output of the audio interface based on the recognized source type.

9 Claims, 6 Drawing Sheets

AUDIO MIXER SYSTEM

CROSS-REFERENCE TO RELATED APPLICATION

This application is the U.S. national phase of PCT Application No. PCT/EP2014/001349 filed on 19 May 2014, which claims priority to EP Application No. 13002611.5 filed on 17 May 2013, the disclosures of which are incorporated in their entirety by reference herein.

BACKGROUND

Audio processing apparatuses are widely used. The EP 2 506 464 A1 shows an audio processing apparatus for processing audio signals from a plurality of sources and a method of outputting status information. The audio mixing console may be combined with a video processing apparatus. Such an apparatus generally has inputs for receiving audio signals from plural signal sources. The signal sources may be microphones. The audio signals may be processed in plural audio channels and may undergo signal mixing. For illustration, processing techniques that may be applied include filtering, amplification, combining or over-blending of plural audio signals, or any combination thereof.

Audio mixing consoles may be complex devices which allow a wide variety of signal operations and parameters for the operations to be set by a user. Adjusting members are provided which allow a user to adjust settings for the signal processing in the various audio channels. An optical output device having one or more graphics displays may be used to provide optical feedback on the audio processing settings selected by an operator.

For various sound sources, such as wireless microphones, information on the status of such devices, which are provided externally of the audio processing apparatus, are of significant value to the operator. For illustration, information on the battery status of a radio microphone, information on a radio frequency (RF) signal strength, information on a mute state set on the microphone or information on an audio level at the wireless microphone may be used by an operator when adjusting settings of the audio processing apparatus or in problem solving.

The WO 2009/153055 A1 shows an audio Mixing Console. Audio mixing consoles are used for applications such as multi track recording, broadcast, post production, live sound reinforcement and stage monitoring. The sound signal from microphones, electronic musical instruments or other signal sources enters the mixing console and the mixing console amplifies these sources as needed and allows the operator to mix them, equalize them and add effects according to the requirements of the installation. To this end, a plurality of control elements is provided, often configured as rotary buttons to control the different functions of the audio mixing console. With the mixing console a large variety of different features of a sound signal can be controlled. In order to limit the number of different control elements on the mixing console, it is possible to control different functions of the audio mixing console using one control element.

SUMMARY

According to one aspect an audio mixer system is provided. The audio system may comprise an audio interface and an audio signal processor and a control circuit. The control circuit may be configured to recognise a source type of an audio signal at the audio interface based on analysing the audio signal. The control circuit may be configured to control a setting of a signal path of the audio signal from an input of the audio interface through the audio signal processor to an output of the audio interface based on the recognized source type.

According to one aspect a method for an audio system is provided. An external device connectable to the audio mixer system is detected.

Recognition of a source type of an audio signal receivable from at least one of the external devices is started. A signal path of the audio signal of the external device is set automatically from an input of an audio interface of the audio mixer system through a signal processing of the audio mixer system to an output of audio interface based on the recognized source type.

According to one embodiment the control circuit may be configured to change between a manual mode and an automatic mode. In the automatic mode the control circuit may be configured to control the setting of the signal path automatically and in manual mode the control circuit may be configured to control the setting of the signal path based on at least one received user input.

According to one embodiment the control circuit may be configured to learn the control of the setting for the automatic mode during the manual mode.

According to one embodiment the control circuit may be configured to learn the control of the setting for the automatic mode during the automatic mode.

According to one embodiment the control circuit may have an artificial neural network to learn the control of the setting of the signal path.

According to one embodiment the artificial neural network may be configured to learn the control of the setting based on at least one received user input.

According to one embodiment the control circuit may be configured to derive an input vector from the audio signal for analysing the audio signal. For source type recognising the control circuit may be configured to compare the input vector of the audio signal with a set of learned vectors. If a comparison is positive a source type is assigned to the input audio signal and the setting of the signal path may be controlled accordingly.

According to one embodiment the artificial neural network may have at least one initial instruction, particularly to control the signal path. The artificial neural network may have an initial instruction to route the audio signal to a default port of the output of the audio interface at a default amplification. If the input vector of the audio signal mismatches with each of the set of learned vectors said instruction applies.

According to one embodiment the control circuit may have the function blocks audio signal analyser, controller and-signal matrix. The controller may be configured to recognise the source type based on an output signal of the audio signal analyser. The controller may be configured to control the signal matrix setting the signal path.

According to one embodiment the audio mixer system may further comprise a non-volatile memory. The controller may be configured to recognise the source type based on an evaluation of the output signal of the audio signal analyser with a predetermined signal stored in the non-volatile memory.

According to one embodiment the predetermined signal may be a sample or a loop of a voice signal relating to a voice source type. According to one embodiment the predetermined signal may be a sample or a loop of a musical instrument signal relating to an instrument source type.

According to one embodiment the audio mixer system may further comprise a communication interface. The controller may be configured to send information based on the setting of the signal path to an external device via the communication interface.

Even a small group of musicians often need an extensive amount of audio equipment for a single performance. After arriving at the location the band has to start to layout gear. Lots of connections have to be made and corrected even during sound checking. During the performance, mixing levels have to be changed, adjustments have to be made. If no sound engineer is in charge the band itself has to manage the complete mixing using a conventional audio mixing console controlled by user inputs at the same time of performing.

The conventional audio mixing console is designed for processing audio signals from a plurality of audio sources. The conventional audio mixing console has a plurality of inputs to receive audio signals. The conventional audio mixing console is configured to process audio signals in a plurality of audio channels administrated by at least one member of the band. For the administration the conventional audio mixing console has adjusting members for adjusting audio processing settings for the plurality of channels.

Figure 1:
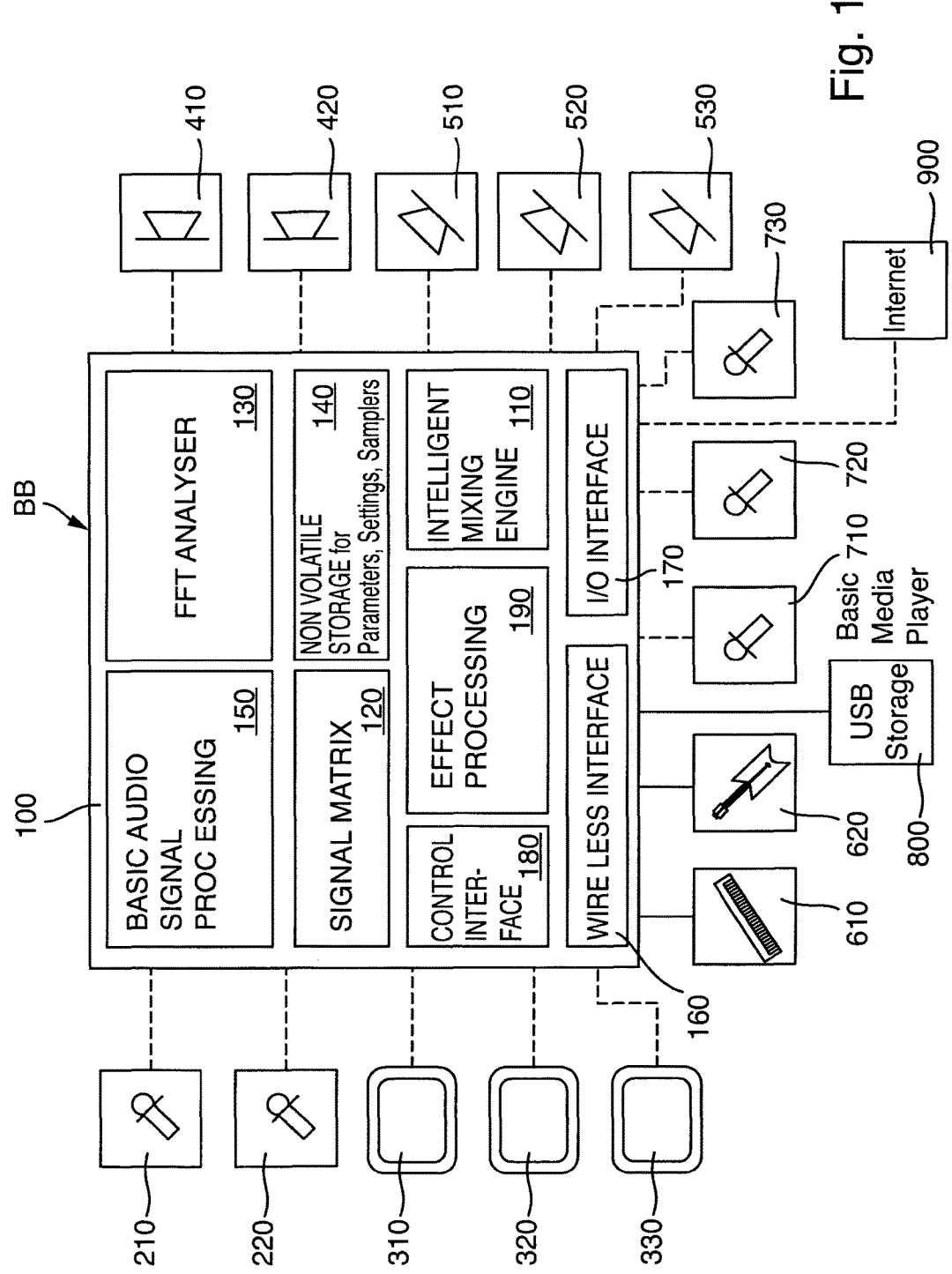
FIG. 1 shows a system diagram of an audio mixer system.

FIG. 1 shows an audio mixer system 100 and several external devices 210, 220, 310, 320, 330, 410, 420, 510, 520, 530, 610, 620, 710, 720, 730, 800, 900 connectable to the audio mixer system 100. The audio mixer system 100 may be configured to mix audio signals from several audio sources, such as vocals and musical instruments. The audio mixer system 100 may be configured to mix two or more audio signals. According to one embodiment the audio mixer system 100 may be configured to mix the two or more audio signals by adding digital values of the audio signals.

According to one embodiment two PA-speaker (PA—engl. Power Amplifier) and three monitor speaker may be connectable wirelessly to the audio mixer system 100. Monitor speakers are used on the stage outputting a signal mixture specific for the musician in front of the monitor speaker, so that the musician can hear his audio channel clearly.

According to one embodiment a number of microphones 710, 720, 730 and a number of musical instruments 610, 620 may be connectable to the audio mixer system 100 by cable or wirelessly. The microphone 710, 720, 730 may receive audio signals from audio sources of different source type. One of such source type may be a voice, like a lead voice or a background choir. One of such source type may be a musical instrument, like brass, drum and so forth.

The musical instruments 610, 620 may be configured to generate audio signals of different source type. One of such source type may be keyboard sound, electric guitar sound and so forth.

According to one embodiment a number of system microphone 210, 220 may be external devices connectable to the audio mixer system 100 wirelessly. The system microphones 210, 220 may not be associated with a specific audio source. The system microphones 210, 220 may be used to record in the location of the audience. The system microphones 210, 220 may be part of a complex device such as a tablet, laptop or smartphone.

According to one embodiment a number control devices 210, 220 like a tablet, laptop or smartphone may be an external device connectable to the audio system 100 wirelessly. According to one embodiment an external storage 800 may be connectable to the audio mixer system 100 by wire or wirelessly. The external storage 800 may comprise a basic media player. According to one embodiment an internet server 900 may be external devices connectable to the audio mixer system 100 wirelessly.

According to one embodiment the audio system may comprise a wireless interface 160, such like a WLAN or Bluetooth interface for providing connections to the external devices 210, 220, 310, 320, 330, 410, 420, 510, 520, 530, 710, 720, 900. According to one embodiment the audio system may comprise an I/O interface 170, such like an audio analogue (XLR, TRS) and audio digital (AES, ADAT, LAN) interface for providing connections to the external devices 610, 620, 800. According to one embodiment the wireless interface 160 and/or the I/O interface 170 may provide an audio interface and a communication interface. The audio interface may be designed to input and output analogue and/or digital audio signals. The audio interface may have a plurality of digital and/or analogue input ports and at least two digital and/or analogue output ports. The communication interface may be designed to send and/or receive communication data, like parameters, settings, commands and so forth.

According to one embodiment the audio mixer system 100 may comprise a number of function blocks 110, 120, 130, 140, 150, 160, 170, 180, 190 operating with each other. Each function block 110, 120, 130, 140, 150, 160, 170, 180, 190 may be implemented as software and/or hardware. E.g. a digital signal processing block 190 may be hardware implemented and a signal matrix block 120 may be software implemented. According to one embodiment the audio mixer system 100 may comprise a basic audio signal processing block 150 for amplifying, filtering et cetera of audio signals received from external devices 610, 620, 710, 720, 730. According to one embodiment the audio mixer system 100 may comprise a effect processing block 190 applying effects to audio signals like reverb, chorus and so forth.

According to one embodiment the audio mixer system 100 may comprise a signal matrix block 120. The signal matrix block 120 is designed to generate a signal path of the audio signal from an input of the audio interface through the audio signal processors 150 and 190 to an output of the audio interface. A routing of the audio signal by the signal path may be defined by hardware and/or software. The routing may define the order of processing applications each audio signal is going through. The route of the audio signal may split for different audio busses used. Also the route of the signal path may be guided through insert effect processing. E.g. an audio signal of a lead voice at the audio interface, received by the wireless interface 160, is switched to the basic audio signal processing block 150 first through the sequence of contained sub-blocks amplification, compression, noise gate and filter. The route of the signal path generated by the signal matrix 120 may continue to the effect processing block 190 adding a reverb signal. The route of signal path generated by the signal matrix 120 may further continue to an output of the I/O interface being transmitted to the monitor speaker 510 of the lead singer. Within the signal path other audio signals of voices or musical instruments may be added/mixed. The signal path may have filters with adjusted parameters to manipulate the audio signal, e.g. to equalize the audio signal.

According to one embodiment the basic audio signal processing block 150 and/or the effect processing block 190 and/or the signal matrix 120 may be configured to be controlled by an intelligent mixing engine block 110, which is also referred as controller 110. According to one embodiment the intelligent mixing engine block 110 is configured to automatically set the signal path. According to one embodiment the intelligent mixing engine block 110 is configured to automatically the processing parameters of the basic audio signal processing block 150 and/or the processing parameters of the effect processing block 190.

According to one embodiment the audio system 100 may comprise an audio signal analyser 130. The audio signal analyser 130 may be configured to analyse an audio signal received at an input of the audio interface. The audio signal analyser 130 may be configured to transform the audio signal from the time domain into the frequency domain. The audio signal analyser 130 may be configured to perform a Fast Fourier Transform (FFT).

According to one embodiment the controller may be configured to recognise the source type of an audio signal at the audio interface based on an output signal of the audio signal analyser.

According to one embodiment the audio mixer system 100 may comprise a non volatile memory 140. The non volatile memory 140 may be a flash memory, a hard-disk et cetera. According to one embodiment the controller may be configured to recognise the source type based on a evaluation of the output signal of the audio signal analyser 130 with a predetermined signal stored in the non volatile memory 140. Each audio signal received at the input of the audio interface may be fingerprinted, a process in which reproducible hash tokens are extracted. The non volatile memory 140 may contain a database, where a data set has a sample or a loop of a signal. The stored signal may previously be recorded from a voice or musical instrument.

The data set additionally may have metadata relating to the source type, e.g. a specific voice or a specific instrument. Both stored signal and the audio signal at the input of the audio interface may be subject to the same analysis. The fingerprints from the unknown audio signal at the input of the audio interface are matched against each fingerprint derived from the stored signals. The candidate matches may subsequently be evaluated for correctness of match. Some guiding principles for the attributes to use as fingerprints for the audio signal are that they should be temporally localized, translation-invariant, robust and sufficiently entropic. The temporal locality guideline suggests that each fingerprint hash shall be calculated using audio signal of a part of the performance being similar to the stored signal, e.g. a refrain of a song, so that time distant events do not affect the hash. The translation-invariant aspect may be that fingerprint hashes derived from corresponding matching content are reproducible independent of position within a song, as long as the temporal locality containing the data from which the hash is computed (audio signal at the input) is contained within the stored signal. Robustness may mean that hashes generated from a previous (initial) recording being the original clean signal stored the database of the memory 140 should be reproducible from a degraded audio signal at the input of the audio interface. The degradation may happen due to different beats/minute or different intonation et cetera. Furthermore, the fingerprint tokens should have sufficiently high entropy in order to minimize the probability of false token matches at non-corresponding locations between the unknown audio signal at the input of the audio interface and the stored signals in the database of the non volatile memory 140. Due to the face, that musical instruments and even different voices have high entropy within one band and their number is very limited, robust detection can be ensured even if the signal is largely degraded.

According to one embodiment for each song of a performance sample or loop may be stored in the database in the non volatile memory 140. Therefore not only the source type of the audio signal, but additionally the current song of the performance may be detected. The data set additionally may have metadata relating to the current song of the performance.

According to one embodiment the controller 110 may be configured to recognise a source type based on predefined characteristics. The controller 110 may distinguish between a bass and a guitar by evaluating the frequency spectrum. The controller 110 may distinguish between a keyboard and a drum by evaluating the dynamic of the amplitude. Alternatives to using a fingerprinting and Fourier transform are shown in embodiments of FIGS. 3 and 4. There the source type is recognised using pattern recognition by an artificial neural network.

According to one embodiment in FIG. 1 the controller 110 may be configured to control the signal matrix 120 setting a signal path of the audio signal from an input of the audio interface through the audio signal processor 150, 190 to an output of the audio interface. The signal path may be set using predefined rule for a specific source type. E.g. there may be a predefined rule that for voice a compressor is looped into the signal path. The path may vary depending on the playing of the instrument. E.g. the signal path is altered between a guitar sound with distortion and a guitar sound without distortion. Also as mentioned above the signal path may be altered between different songs.

According to one embodiment the controller 110 may be configured to control the parameter settings of the basic audio signal processing and the effect processing, so that the signal processing may be automatically adjusted based on the recognised source type.

According to one embodiment the non volatile memory 140 may be configured to contain settings pre-definable by a user, so that the musicians can deviate from a default automatic mixing and individually plan their mixture for the performance in advance.

According to one embodiment the signal path may be visualised on a screen of a tablet 310 wirelessly connected to the audio mixer system 100. The audio mixer system 100 may be configured to adjust the signal path. The audio mixer system 100 may be configured to adjust settings of the processing based on manual user inputs.

Figure 2A:
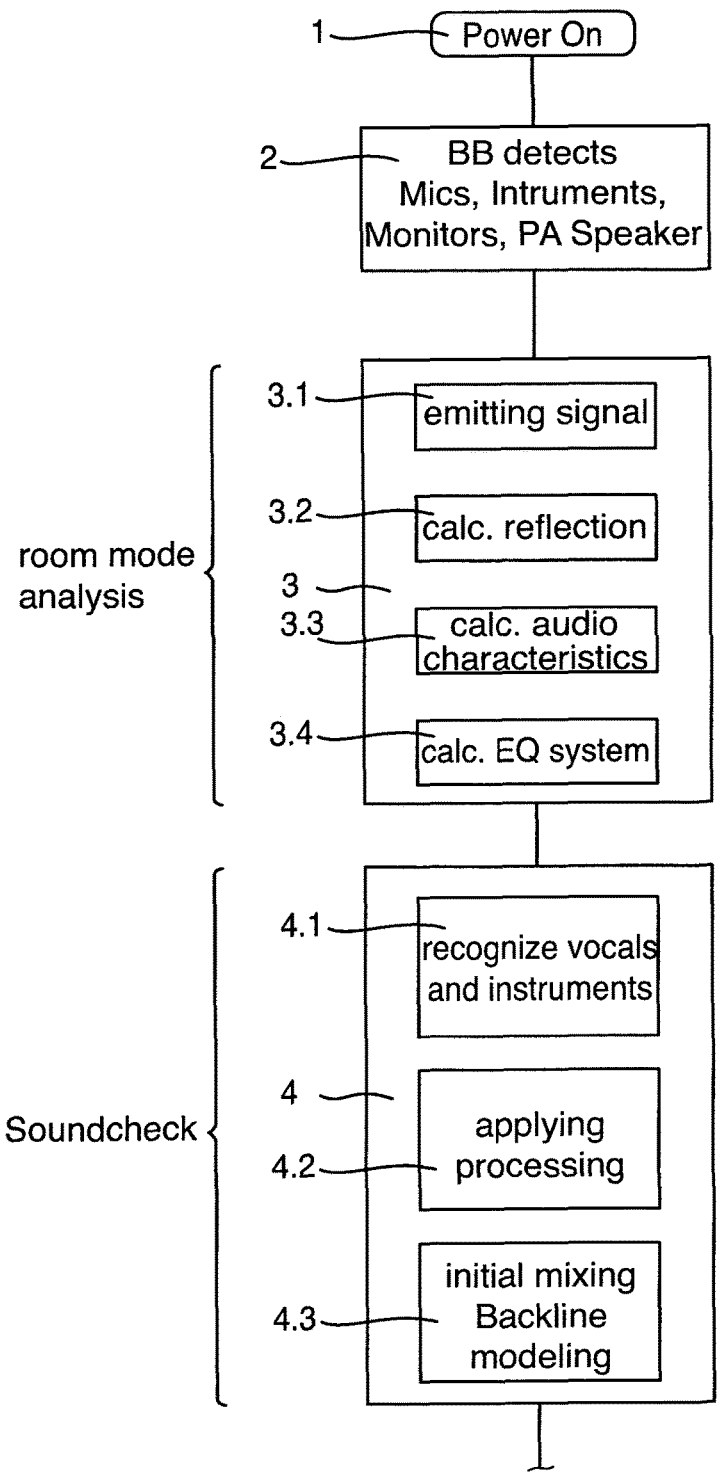
FIGS. 2a to 2c show a flow diagram of a method for an audio mixer system.
Figure 2B:
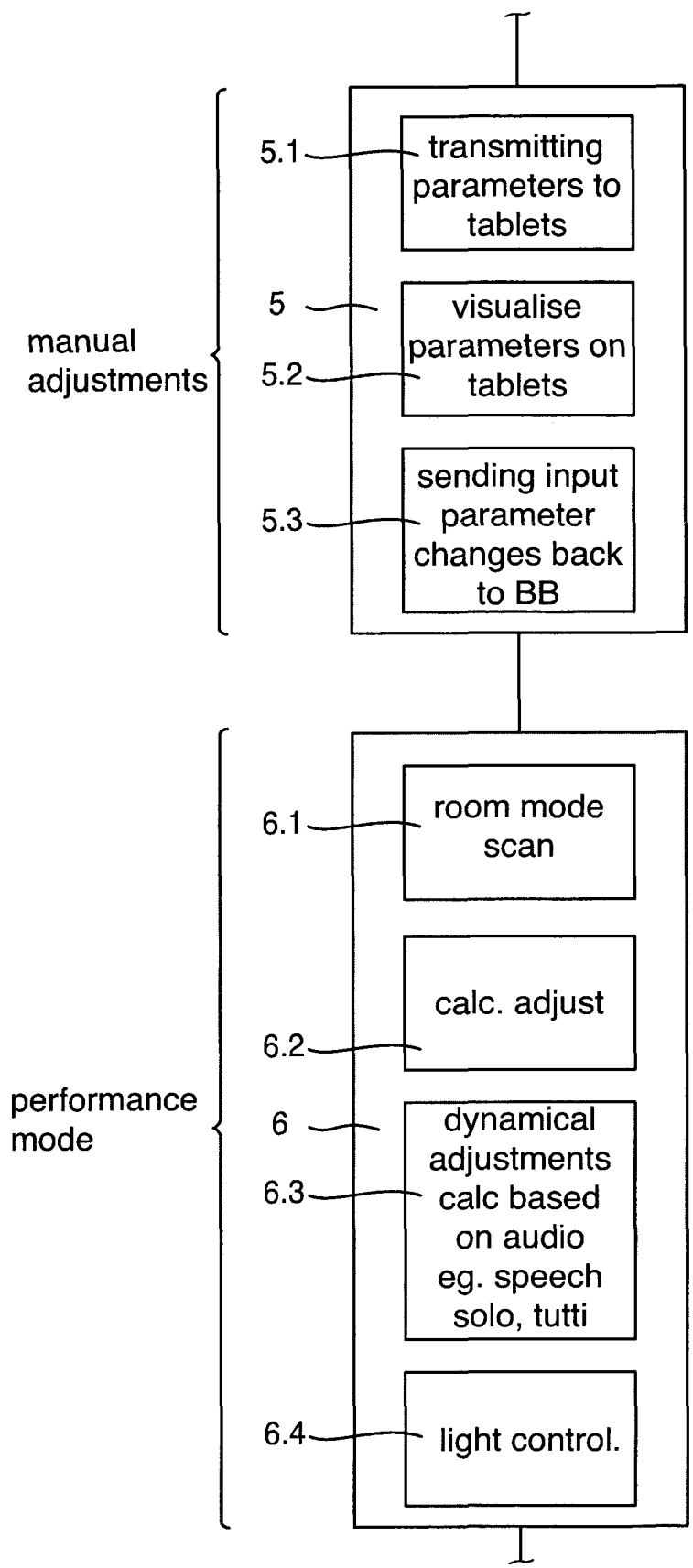
Figure 2C:
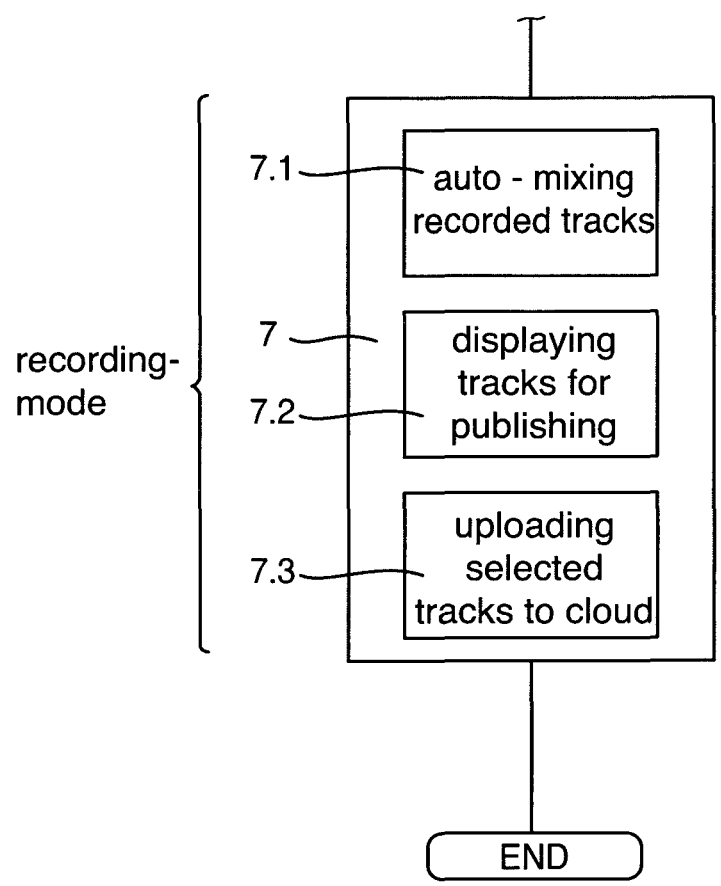

FIGS. 2*a*, 2*b* and 2*c* show a flowchart of a method running an audio mixer system BB. In a first step 1 the audio mixer system BB may be powered on. In a second step 2 the audio mixer system BB may detect external devices, like microphones, electronic musical instruments, monitor speakers, PA speaker and the like. According to one embodiment the audio system BB may detect the type of the device, like the type of microphone, speaker et cetera. According to one embodiment the audio system BB may detect a location the external device is placed, e.g. relative to two PA-speakers defining stereo sound.

Step 2 may follow a third step 3 having an acoustical room mode analysis. In step 3.1 a signal for measuring acoustical properties of the room is emitted. The room may be divided into the stage and the auditorium. The signal for measuring acoustical properties may be a white noise, reproduced subsequently from each speaker connected.

In the step 3.2 acoustical reflections of room are calculated. According to one embodiment the emitted signal is received by system microphone 210, 220 as shown in FIG. 1. The system microphone 210, 220 may be part of a smartphone or tablet. Using the system microphone 210, 220 the user can easily walk around and measure the emitted signal at different locations of the auditorium and on stage. Acoustical reflexions may be calculated based on the emitted signal and signal received by the system microphones 210, 220.

In step 3.3 acoustical characteristics of the room may be calculated. Such acoustical characteristics may be the length and strength of the reverberation of the room. In step 3.4 equalizer parameters of the audio mixer system BB, 100 may be calculated. Equalizer parameters may be calculated to achieve linear behaviour during the performance. E.g. the equalizer parameters are set to cancel out an acoustical damping at an estimated frequency by setting a bandpass filter amplification. After the room mode analysis in the third step 3 the room acoustics should sound as neutral as possible.

The results of the calculations may be stored in the non volatile memory 140. According to one embodiment the results may be uploaded to the internet, e.g. for the use of other community members. Results of the calculations may also be downloaded before the third step 3, to initialise the room mode analysis with the downloaded results.

In a fourth step 4 a soundcheck may be performed automatically. According to one embodiment the soundcheck is started, when a playing of the band, e.g. a song of the performance, is detected. In step 4.1 each source type, vocals and instruments are recognised. E.g. a lead singer, a second voice and a third voice and a background choir, a drumset, a keyboard, a saxophone, an electric guitar and an electric bass are recognized. In step 4.2 processing may be applied defining the signal path for each source type. In step 4.2 processing may be applied defining processing parameter for the basic audio signal processing and the effect processing for each source type.

In step 4.3 an initial mixing is performed, while the band is playing. Backline modelling may be applied to instrument channels and pedals.

In a fifth step 5 manual adjustments are enabled. In step 5.1 parameters and signal paths may be transmitted to tablets 310, 320, 330. In step 5.2 the parameters are visualised on the screen of the tablets 310, 320, 330. In step 5.3 input parameters and changes may be sent back to the audio system BB, 100. Tablet visual feedback may provide personal or complete mix parameters, adjustments may be made manually. Also personal monitoring may be adjusted locally via remote tablet input. The tablet 310, 320, 330 may show a status of the audio system BB. The user may review the auto-set up of the audio mixer system BB.

Parameters and signal paths may be stored in the non volatile memory 140. According to one embodiment the parameters and signal paths may be uploaded to the internet, e.g. for further use under similar circumstances. Parameters and signal paths may also be downloaded before the fifth step 5. In this case the audio mixer system BB may automatically search the cloud in the internet using GSM/UMTS connection or venue locator to explore previously used templates compatible to the audio system BB. If the audio mixer system BB finds at least one template, the soundcheck may be completed in seconds.

After the venue starts to fill and the gig commences a performance mode in a sixth step 6 may be started. In step 6.1 a room-mode scan may detect acoustic changes. E.g. due to the audience other acoustical damping may occur. In step 6.2 parameters adjustments may be calculated. In step 6.3 dynamical adjustments may be calculated based on audio signals originating from a musician (audio source). Therefore different parameters or signal paths may be set based on the performance, like detected speech, solo, tutti et cetera.

In step 6.4 light control may be performed. The light control may be based on the results of the fingerprinting method, automatically controlling the lights song dependent. E.g. light and sound may be changed due to the detection of speech rather than a song. When the band performs, the tablet 310, 320, 330 may show a visualisation of dynamical adjustments and auto-mixing the music by means of the audio system BB.

In a seventh step 7 the audio system may auto-mix recorded tracks. According to one embodiment a multi-channel recording may be downmixed in a stereo signal after the performance. According to one embodiment the downmixing may be done during the performance and only a stereo signal may be recorded and stored e.g. by means of the external storage 800. In step 7.2 the tracks may be displayed on a tablet 310 320, 330 for publishing. The audio mixer system BB may request a manual permission to publish chosen tracks in a cloud for social media streaming.

In step 7.3 the downmixed songs may be selected for uploading to the cloud. The audio mixer system BB may upload the songs in seconds. People may listen to the songs on other side of the planet seconds later.

Figure 3:
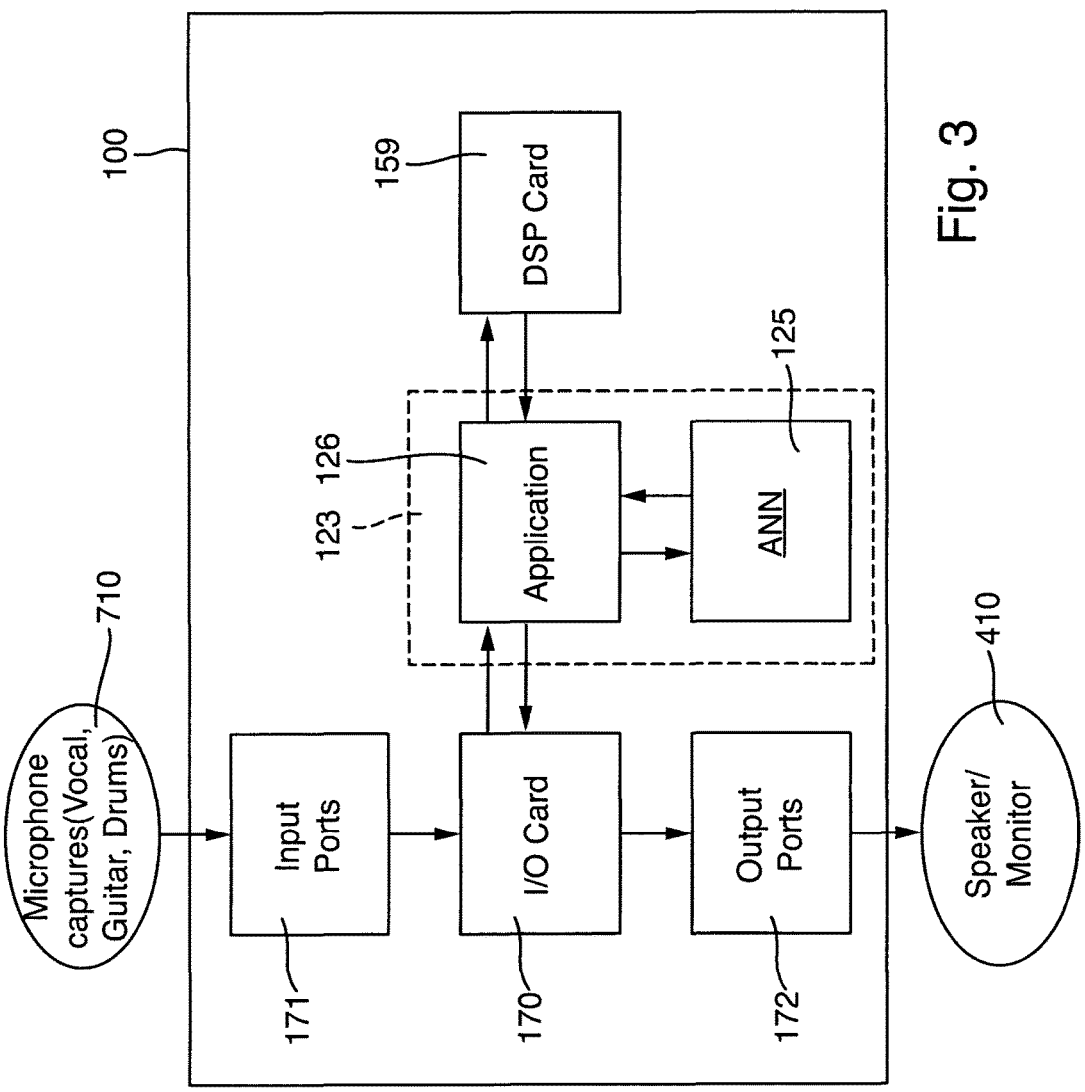
FIG. 3 shows an audio mixer system.

According to one embodiment of FIG. 3 an audio mixer system 100 is shown. The audio mixer system 100 is an electronic device for combining, routing, and changing the level, timbre and/or dynamics of audio signals. The audio mixer system 100 can mix analogue and/or digital signals. A user may be an operator or sound engineer, who may perform inputs to the audio mixer system 100 to get the output of the desired sound result. The user may use his past experience and learnings to make sure the mixed audio signals are well heard.

According to the embodiment of FIG. 3 the audio mixer system 100 may be provided with certain intelligence. If the audio mixer system 100 can learn, it may be configured to use the past learnings to decide what settings to be changed depending on the input signals to make sure the output signal is well heard. An intelligent audio mixer system 100 would reduce the need of an operator or sound engineer to operate audio mixer system 100 significantly.

According to one embodiment shown in FIG. 3 the audio mixer system 100 may have an audio interface 170 in form of an I/O card having a plurality of input ports 171 and several output ports 172. The audio interface 170 may have analogue to digital converters, so that an input analogue signal would results in a stream of binary data fed to a control circuit 123. Microphones to capture sounds, like vocal, guitar or drums may be connected to the input ports 171. Power amplifiers or speakers, like PA-speakers or monitor speakers may be connected to the output ports 172. The audio mixer system 100 may have an audio signal processor 159 in form of a DSP card. The audio signal processor 159 may be configured to process audio signals received by the audio interface 170. Such processing may be reverb, delay, filtering etc.

According to one embodiment shown in FIG. 3 the audio mixer system 100 may have a control circuit 123. The control circuit 123 is configured to recognise a source type of an audio signal at the audio interface 170 based on analysing the audio signal. For analysing the audio signal the control circuit 123 has an artificial neural network ANN 125.

The artificial neural network 125 with artificial neurons can achieve some degree of intelligence for the audio mixer system 100. The artificial neural network 125 can be good at problems which are easy for a human but difficult for a traditional computer program.

The artificial neural network 125 may also be referred to as feedback system. The artificial neural network 125 may be trained by the user. Depending on the input signals the user may change certain parameters of the audio mixer system 100. Those changes are taken as instructions or operation to be performed on the input signal, during processing, so that the result is the desired output signal. With learning/training and experience, the user is able to decide which parameters have to be changed so that the output sounds better. With due course of time the user would have gained enough experience such that, just by listening to an input sound stream, the user can decide which all parameter can be changed to make the output sound perfect for his taste.

The artificial neural network 125 of the audio mixer system 100 may correspondingly learn, continuously and in due course of time. Afterwards the artificial neural network 125 of the audio mixer system 100 may be experienced enough to decide what all parameters needs to be changed to make the output sound similar.

Input signals are fed to the artificial neural network 125, from the input signals the artificial neural network 125 finds a pattern within the audio signal. The artificial neural network 125 compares the found pattern with a pattern already stored or trained to be handled. An already stored or trained pattern is assigned to the recognised source type. E.g. an audio signal from a drum matches with a trained pattern, which is assigned to the source type "drum". The recognised source type "drum" may be displayed to the user using a display of the audio mixer system 100 or an external device.

Depending on how artificial neural network 125 is trained to handle such a found pattern, artificial neural network 125 may handle and perform operations so that the desired output is achieved. The artificial neural network 125 may be consisting of a large number of interconnected artificial neurons. Artificial neurons may be combined so that they form a network of interconnected artificial neuron. Each artificial neuron can receive inputs and each input may be associated to a weight. The output from a single artificial neuron may be determined by each input and its corresponding associated weight.

Each artificial neuron may have a summation unit which would sum up all the weighted inputs. The summation unit does a linear summation. A decision is taken out of the summation, like whether yes or no or a decision which is more quantifiable. In order to achieve a decision the summation unit may be followed up by some non-linear processing unit. The output that is available from the non-linear unit will be the output of the artificial neuron. If the output from the artificial neuron is different from that of what is desired, the weights for the inputs may be changed so that with the same set of inputs, an output as close as to the desired output is achieved. The output is directly dependent on the inputs and connection weights. The input cannot be changed but the connection weights can be changed to get the desired output.

According to one embodiment the control circuit 123 may be configured to control a setting of a signal path of the audio signal from an input of the audio interface 170 through the audio signal processor 159 to an output of the audio interface 170 based on the recognised source type. According to one embodiment the control circuit 123 has an artificial neural network 125 to learn the control of the setting of the signal path. The signal path may have a routing of the signal from an input port 171 through a DSP card 159 to an output port 172 and parameters assigned to the signal path, e.g. filtering.

According to one embodiment the connection weights between the neurons of the artificial neural network 125 may be updated (learning) for a particular input pattern to set the signal path to get the desired output, so that when a similar input pattern is received and assigned to a source type, with the updated connection weights the same output is achieved. This may also be referred to as learning or training the artificial neural network 125.

There are two approaches for learning, a top down approach and a bottom up approach. The top-down learning is best described in programming term as a set of sequential, cascading if/else statements which are not self-modifying. In other words, the computer is programmed to perform certain actions at pre-defined decision points. There are so many different aspects which might affect the ultimate decision that an algorithm programmed into the computer using this top-down method would be sophisticated covering all aspects of the audio mixer system. The limitation of this approach is, in order to program a complex task, the programmer may have to spend a long time developing a correct top-down approach. The bottom up approach learns more by example or by doing, than a complex set of cascading if/else statements. It tries to do something in a particular fashion, and if that doesn't work, it tries something else. By keeping track of the actions that didn't work and actions that did, the system can learn. Moreover, the program is inherently self-modifying.

The audio mixer system 100 may use a combination of both of these approaches. Some instructions may be hardwired into the audio mixer system 100 also having the artificial neural network 125, which may follow the bottom up approach. For example, initial instructions would be provided like which operations are allowed, certain boundary values and which combinations of operations would fail miserably.

According to one embodiment the artificial neural network 125 has at least one initial instruction. The initial instruction, which may not be specific to the artificial neural network 125 but for the whole system, could be referred to as hardwired instructions. Hardwired instruction means that controlling this instruction may be based on written program code. Such hardwired instructions may be activating the artificial neural network 125 when switching on the audio mixer system 100. Another instruction may be controlling mode of operation for the audio mixer system 100 (manual or automatic). In manual mode the user may manage the audio mixer system 100 and the artificial neural network 125 would be in learning mode. In automatic mode the artificial neural network 125 would control the audio mixer system 100. Another hardwired instruction may be testing the connectivity of the inputs and outputs ports and detecting which all ports are active. If for any reason the application crashes/freezes, a hardwired instruction may restart the system and activate the artificial neural network 125. Another hardwired instruction may be launching a help wizard to guide the user.

Hardwiring is for the system level, whereas initial instruction refers only for the artificial neural network 125. Once the artificial neural network 125 is up and running it checks whether the application is in proper state. Depending on mode of operation (Manual or Automatic) the artificial neural network 125 runs in the respective mode.

According to one embodiment the artificial neural network may have one instruction to route the audio signal to a default port 172 of the output of the audio interface 170 at a default amplification. This may be an initial instruction for each input port 171. Using such initial instruction may be displayed to the user. If the input vector of the audio signal mismatches with each of the set of learned vectors, the instruction to route the audio signal to a default port 172 of the output of the audio interface 170 at a default amplification may be set.

According to one embodiment an operation controlled by an application block 126 of the audio mixer system 100 may initially be allowed or not allowed. While operating the audio mixer system 100 there might be some constraints which would have to be handled by the application block. Also there may be some operations which would result in undesired result. The user by his experience may be aware of those but the not allowed operations need to be learned by the artificial neural network 125. In contrast the allowed operations include the common operation which the user performs in a manual mode of the audio mixer system 100, e.g. changing the fader value or changing the low cut filter to reduce the noise in the signal.

According to one embodiment the control circuit 123 is configured to change between a manual mode and an automatic mode. In manual mode the audio mixer system 100 may be controlled mainly based on received user inputs, so that and in manual mode the control circuit 123 may be configured to control the setting of the signal path based on at least one received user input. User inputs may be received from a remote controlling device, e.g. wirelessly from a mobile device 310 as shown in FIG. 1. By the user inputs the application function block 126 in FIG. 3 is controlled, whereas the application functions block 126 may define the signal path of an audio signal input via an input port 171, the I/O card 170 to the DSP card 159 and again via the I/O card 170 and the output port 172 to a speaker 410.

The digital signal processing of the audio signal is done in the DSP cards 159. The user may change the value of certain parameters in the audio mixer system 100. The changed values are passed on to the DSP card 159 and audio processing may be applied to the audio signals. Each of those parameters of the digital audio processing has a predefined range or boundary values for a particular purpose.

For example:

The fader value can be move from −90 to 10.

The frequency can be varied from 20 Hz to 20 kHz.

The gain of each frequency could be varied from −15 to 15.

The pan level can be varied from 30L to 30R.

According to one embodiment in FIG. 3 application block 126 may refer to software which runs on the audio mixer system 100. The application block 126 may act as an interface (middle layer) between a user interface, e.g. a hardware or software desk of the audio mixer system 100 and a core having the digital signal processing 159. The application block 126 has an user interface module, the user can use to change some settings of the audio mixer system 100. The user may change a fader in the desk, the fader value change event may be captured by the application block 126 and the application block 126 sends the new gain value to DSP card 159.

According to one embodiment of FIG. 3 an artificial neural network block 125 may refer to an independent block, which has bidirectional communication with the application block 126, but it's not a part of the application block 126. The artificial neural network block 125 may not have an user interface module. The artificial neural network block 125 receives input vectors from the application block 126. After receiving the input vectors it passes the input vectors through its network. Depending on how the artificial neural network block 125 was learned to react to similar input vectors it provides output. Output of the artificial neural network block 125 may be used to switch on/off or set a value (e.g. gain) for one audio input signal or a bus. Hence the output of the artificial neural network block 125 may be sent to application block 126. The "Application" Blocks may send such value to the DSP card 159.

In automatic mode the control circuit 123 may be configured to control the setting of the signal path automatically. According to one embodiment of FIG. 3 outputs of the artificial neural network 125 may control the setting of the signal path in the automatic mode without the necessity of a user input.

According to one embodiment of FIG. 3 the artificial neural network's 125 output may set an application function block 126 defining the signal path. The application function block 126 may further be configured to control the parameter of the DSP card 159 for the signal path.

According to one embodiment the control circuit 123 may be configured to learn the control of the setting for the automatic mode during the manual mode and/or during the automatic mode. The artificial neural network 125 of the control circuit 123 may be configured to learn the control of the setting based on received user inputs. There several learning methods, like memory based learning, error correction learning, Hebbian learning, competitive learning or Boltsmann learning. According to one embodiment the artificial neural network 125 is configured to learn based on at least one of the memory based learning, the Hebbian learning and the competitive learning.

Memory Based Learning:

The artificial neural network 125 may have n different inputs ranging from x1 to xn. First for simplicity, the case of a single neuron is assumed. To a single neuron a set of inputs from x1 to xn may be fed and the output may be y. Feeding a set of input defines a pattern so the input pattern may contains x1, x2, x3 . . . xn. This pattern mathematically can be called as a vector. The audio mixer system 100 tries to memorize the association between the input vector and output. For input vector x output is d where d assumes some value associated with the input pattern vector x. For defining a system behaviour m such patterns may be stored represented as set of x vector {xi} i=1 to m. For every xi vector there would be a desired output di. This can be represented as association of {xi,di} i=1 to m. For multiple output neurons again di would be a vector. The audio mixer system 100 may store all these patterns, and the association between the input vector and output in a large memory. When the audio mixer system 100 encounters an input pattern, it first tries to compare with the set of stored input patterns. If the input pattern matches ones, the desired output may be achieved and the input pattern may be assigned to a source type. If the audio mixer system 100 is provided with an input pattern e.g. xnew which has not been encountered before, and if the learning is proper the audio mixer system 100 may find out from the memory which of the stored input vectors xi is closest to the new pattern xnew. Closest may refer to the minimum Euclidean distance between the vector xnew & xi. Once the system finds out the closest input vector, it may use the same connection weight to get the output and again may store the results in the memory. As memory holds a key to this type of learning it is referred to as memory based learning.

Hebbian Learning:

As per the name the basic concept was introduced by psychologist Hebb. In case of biological neuron when a biological neuron fires another neuron the metabolic process in the brain would be such that the synoptic connection strengths of such cells are strengthened. Translating the same idea to artificial neurons: There may be two artificial neurons of the artificial neural network 125, one defined as pre synoptic neuron and other as the post synoptic neuron connected to each other by the synoptic weight or the connection weight. If at any point of time both of these neurons are active the synoptic weight/connection strength between the neurons may be increased. In simple term if there is positive correlation (both the artificial neurons are activated at a particular time frame) the synaptic weight between the two artificial neurons may be increased. The reverse may or may not be true.

Competitive Learning:

In an artificial neural network 125 of artificial neurons, several inputs neurons and several output neurons are interconnected to each other by synaptic weight. In such an artificial neural network 125 there is no restriction that at any point of time only one output neuron would be active. In case of competitive learning those neuron competing not only try to strengthen its winning chances for the next time (updating the synaptic weight) but they also try to weaken others by reducing there connection strength. There always exist a relative inhibition between the competing neurons, but they also try to strengthen the feed forward network. If one of the output neuron wins a particular input pattern, the synaptic weights of the artificial neural network 125 would be such adjusted when similar input pattern comes as an input the winner neuron would be favoured and easy for that neuron to win. The spirit of competitive learning is the winner will be favoured next time for same input pattern.

According to one embodiment the control circuit 123 may have an artificial neural network 125 to learn the control of the setting of a signal path for audio signals processed by the audio mixer system 100. The artificial neural network 125 may be an inherently multiprocessor-friendly architecture. Without much modification, it may go beyond one or even two processors. The artificial neural network 125 may be designed from the onset to be parallel. With a massively parallel architecture, the artificial neural network 125 can accomplish a lot in less time. Because of its style of learning, the artificial neural network 125 can, in essence, program itself. The artificial neural network 125 may be continuously adaptable by truly altering its own programming. Such audio mixing system 100 would give evidential response, i.e. the decision with a measure of confidence. Initially it may be low but with continuous learning the confidence level and accuracy would increase significantly. Additionally the audio mixer system 100 learns the personal style of a user continuously using it. E.g. the audio mixer system 100 may learn the settings for a group of musicians. Additionally there may be different learning data for different groups of musicians or even for different performances for the same group of musicians. The audio mixer system 100 can be designed by VLSI implementation. Matlab and Octave tool may be used for designing such learning system.

The embodiment of FIG. 3 provides several advantages. Once the system has complete learning and prepared to handle different inputs, it can eliminate the need of an operator. Even, if an operator is available, manual error during operation will be reduced significantly. Once the system in trained. The customer can easily plug in the inputs and start using it. Depending on how the operator operates on the audio mixer system 100 in a given environment, the artificial neural network 125 would learn those operations and perform similarly in the absence of the operator. Once the artificial neural network 125 may have a set of input vectors, there can be an additional feature where it would simulate those set of input vectors as the input to the system and check the response for accuracy. If the operator is not much experience in handling certain inputs, the artificial neural network 125 helps him to get the desired response. In several cases, although the audio mixer system 100 supports lots of feature, the features may not be used because of lack of knowledge of the operator. For him such features remain unexplored. With the proposed system this problem can be eliminated. Additionally a trained audio mixer system 100 may be configured in training the operator. He can do some settings and then verify how the audio mixer system 100 behaves and validate his settings. E.g. the audio mixer system 100 may propose alternative settings. In automatic mode the audio mixer system 100 would operate on its own and operator may just monitor the operation, and may take control if he needs to. By this scenario the user may further train the artificial neural network 125 of the audio mixer system 100.

The audio mixer system 100 may be configured to be used during performance. Similar to a cue list feature, for each song in a performance the user may set few parameters and saves it in a cue. During the performance he just selects the cue manually or it get triggered from a timer event. Once the cue is selected all those preconfigured parameters are applied. These preconfigured parameters may be learned by the artificial neural network 125. The artificial neural network 125 may work one level below. The artificial neural network 125 knows what the input has been and how it was handled earlier. E.g. for a particular background vocal the user had changed five parameters to make it sound "sweet". For a particular solo vocal the user had changed two parameters to make it sound "sweet". Every audio signal is a combination of different frequencies and its harmonics at different intensities; this is how the user distinguishes the audio signals. The artificial neural network 125 sniffers the signal before the DSP and checks the properties of the signal, the inputs vectors for all the audio signals would differ, depending on the input vectors. The artificial neural network 125 may be configured to decide what processing element has to be imposed to the signal. The artificial neural network 125 then applies the required processing element on the DSP card 159. E.g. the background vocal signal after digitalization is represented as an input vector m1 and the solo vocal signal after digitalization is represented as input vector m2. The artificial neural network 125 recognizes input vector m1, The artificial neural network 125 checks for similar patterns and changes the five parameters as done by the user earlier to sound "sweet". The artificial neural network 125 recognizes input vector v2, so the artificial neural network 125 again checks for similar patterns and changes the two parameters as done by the user earlier to sound "sweet".

Figure 4:
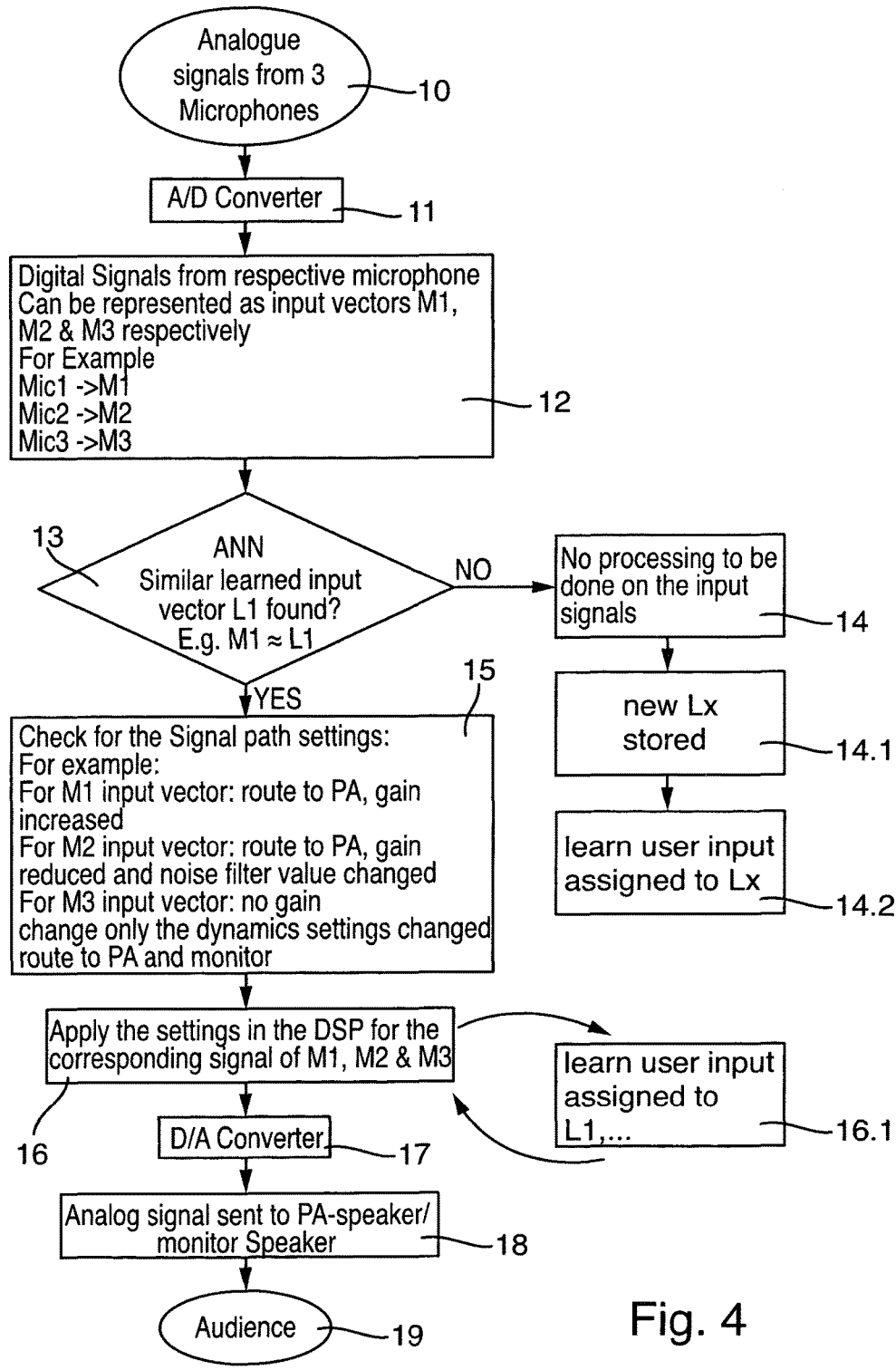
FIG. 4 shows a simplified flow chart.

In FIG. 4 a simplified flow chart is shown. E.g. analogue Signals from three microphones are received in a first step 10. The analogue audio signals from the microphones are converted into digital audio signals in the following step 11. In the next step 12 digital signals from the respective microphones may be represented as input vectors M1, M2 and M3. According to one embodiment of FIG. 3 the control circuit 123 may be configured to derive each input vector M1, M2, M3 from the corresponding audio signal. E.g. the control circuit 123 may read a set of digital values of the audio signal and forward the set of digital values to the artificial neural network 125.

In the next step 13 in FIG. 4 the artificial neural network ANN compares each input vector M1, M2, M3 with a learned input vector L1. According to one embodiment of FIG. 3 the control circuit 123 may be configured to recognise a source type of the audio signal. For the source type recognising the artificial neural network 125 of the control circuit 123 may be configured to compare the input vector M1, M2, M3 of the audio signal with a set of learned vectors L1. In FIG. 4 for simplicity only one learned vector L1 of the set is shown.

If the comparison in step 13 of FIG. 4 is positive step 15 may follow. In step 15 the signal path settings are checked and modified, if necessary. E.g. for the input vector M1 the corresponding input audio signal may be routed to the PA-speakers and the gain may be increased to a learned value. E.g. for the input vector M2 the corresponding input audio signal may be routed to the PA-speakers and the gain may be reduced to a learned value and a noise filter parameter may be changed to a learned value. E.g. for the input vector M3 the corresponding input audio signal may be routed to the PA-speakers and monitor speakers. The gain may remain unchanged and dynamic setting, e.g. of an audio compressor may be changed to a learned value. All these settings may be part of a signal path for the corresponding audio signal. According to one embodiment of FIG. 3 the control circuit 123 may be configured to control a setting of the signal path of the audio signal from an input of the audio interface 170 through the audio signal processor 159 to an output of the audio interface 170 based on the recognised source type by means of the artificial neural network 125 using learned vectors L1. Similar to the operation of an experienced user the artificial neural network 125 also adjusts the parameters in the DSP card 159 so that the output is well heard.

In the next following step 16 of FIG. 4 the new settings concerning the signal path may be applied. Settings in the DSP card 159 for the corresponding audio signal of M1, M2 and M3 may be applied. After an output signal may be converted in an analogue signal in step 17 and sent to the PA-speaker or monitor speaker in step 18 the changes done in step 16 may be heard by the audience or the user in step 19.

According to one embodiment of FIG. 4 the user may intervene at any time in step 16.1 via a user interface. User inputs in step 16.1 may be learned by the artificial neural network 125 and assigned to the learned vector L1.

If in step 13 (M1≈L1) no similarity of an input vector M1 to a learned vector L1 is found, so that the input vector M1 of the audio signal mismatches with each of the set of learned vectors L1, no changing of the settings may be done for the corresponding input signal in step 14. Instead at least one initial instruction may be used. In this case the artificial neural network 125 may have one instruction to route the audio signal to a default port 172 of the output of the audio interface 170 at a default amplification, so that the audio signal is at least hear able at a monitor speaker or PA speaker. Therefore in this case a default signal path is set.

In step 14.1 a new leaned vector Lx may be derived from the unknown input vector and stored for future comparison. In step 14.2 user inputs concerning the signal path including parameters for the digital signal processing may be learned by the artificial neural network 125 assigned to the new vector Lx and stored for future settings.

REFERENCES

100, BB Audio system
110 Controller, intelligent mixing engine
120 Signal matrix, switching device
123 Control circuit
125, ANN Artificial Neural Network
126 Application block, controller
130 Analyser, FFT-analyser
140 Non-volatile storage
150 Basic audio signal processing
159 Digital Signal Processing-Card, DSP-Card
160 Wireless interface
170 I/O interface, I/O Card
171 Input port
172 Output port
180 Control interface
190 Audio effect processing
210, 220 System microphone
310, 320, 330 Tablet, laptop, smart phone
410, 420 PA-speaker
510, 520, 530 Monitor speaker
610, 620 Music instrument
710, 720, 730 Microphone
800 USB storage
900 Internet, social media
M1, M2, M3, L1, Lx Vector
Mic1, Mic2, Mic3 Audio signal

The invention claimed is:

1. An audio mixer system comprising:
an audio interface,
an audio signal processor, and
a first controller;
wherein the first controller of the audio mixer system is configured to recognize a source type of an audio signal at the audio interface based on analyzing the audio signal, and
wherein the first controller is configured to control a setting of a signal path of the audio signal from an input of the audio interface through the audio signal processor to an output of the audio interface based on the recognized source type,
wherein the first controller is configured to change between a manual mode and an automatic mode,
wherein in the automatic mode, the first controller is configured to control the setting of the signal path automatically,
wherein in manual mode, the first controller is configured to control the setting of the signal path based on at least one received user input,
wherein the first controller is configured to learn the control of the setting for the automatic mode during one of the manual mode and the automatic mode,
wherein the first controller has an artificial neural network to learn the control of the setting of the signal path,
wherein the artificial neural network is configured to learn the control of the setting based on received user inputs,
wherein the first controller is configured to derive an input vector from the audio signal for analyzing the audio signal, wherein for source type recognizing, the first controller is configured to compare the input vector of the audio signal to a set of learned vectors, and wherein the artificial neural network has at least one initial instruction to control the signal path.

2. The audio mixer system according to claim 1, wherein the artificial neural network is configured to learn the control of the setting based on received user inputs.

3. The audio mixer system according to claim 1, wherein the artificial neural network has an initial instruction to route the audio signal to a default port of an output of the audio interface at a default amplification in response to the input vector of the audio signal being mismatched with each of the set of learned vectors.

4. The audio mixer system according to claim 1,
wherein the first controller has function blocks including:
an audio signal analyser,
a second controller, and
a signal matrix,
wherein the second controller is configured to recognize the source type based on an output signal of the audio signal analyser, and
wherein the second controller is configured to control the signal matrix setting the signal path.

5. The audio mixer system according to claim 4, further comprising
a non-volatile memory,
wherein the second controller is configured to recognize the source type based on an evaluation of the output signal of the audio signal analyser with a predetermined signal stored in the non-volatile memory.

6. The audio mixer system according to claim 5,
wherein the predetermined signal is a sample or a loop of a voice signal relating to a voice source type, or
wherein the predetermined signal is a sample or a loop of a musical instrument signal relating to an instrument source type.

7. The audio mixer system according to claim 1, further comprising
a communication interface,
wherein the first controller is configured to send information based on the setting of the signal path to an external device via the communication interface.

8. A method for an audio mixer system, comprising:
detecting external devices connectable to the audio mixer system;
starting a recognition of a source type of an audio signal receivable from at least one of the external devices;
setting a signal path of the audio signal of the external device from an input of an audio interface of the audio mixer system through a signal processing of the audio mixer system to an output of the audio interface based on the recognized source type;
changing between a manual mode and an automatic mode,
wherein in the automatic mode, the setting of the signal path is controlled automatically, and
wherein in the manual mode, the setting of the signal path is controlled based on at least one received user input; and
learning the control of the setting for the automatic mode during one of the manual mode and the automatic mode;
learning the control of the setting of the signal path via an artificial neural network, wherein the artificial neural network learns the control of the setting based on received user inputs,
deriving an input vector from the audio signal for analyzing the audio signal, and
comparing the input vector of the audio signal to a set of learned vectors for source type recognizing, wherein the artificial neural network has at least one initial instruction to control the signal path.

9. An audio mixer system comprising:
an audio interface;
an audio signal processor; and
a controller configured to:
analyze an audio signal at the audio interface of the audio mixer system,
recognize a source type of the audio signal in response to analyzing the audio signal, and
control a setting of a signal path of the audio signal from an input of the audio interface through the audio signal processor to an output of the audio interface based on the recognized source type, wherein the source type includes one of a vocal input and an audio input from a musical instrument,
wherein the controller is configured to change between a manual mode and an automatic mode,
wherein in the automatic mode, the controller is configured to control the setting of the signal path automatically,
wherein in manual mode, the controller is configured to control the setting of the signal path based on at least one received user input,
wherein the controller is configured to learn the control of the setting for the automatic mode during one of the manual mode and the automatic mode,
wherein the controller has an artificial neural network to learn the control of the setting of the signal path,
wherein the artificial neural network is configured to learn the control of the setting based on received user inputs,
wherein the controller is configured to derive an input vector from the audio signal for analyzing the audio signal,
wherein for source type recognizing, the controller is configured to compare the input vector of the audio signal to a set of learned vectors, and
wherein the artificial neural network has at least one initial instruction to control the signal path.

* * * * *